United States Patent
Averitt

(10) Patent No.: US 10,374,442 B2
(45) Date of Patent: Aug. 6, 2019

(54) INTEGRATED MULTIPLE VOLTAGE ENERGY STORAGE SYSTEM AND METHOD

(71) Applicants: Robert Bosch Battery Systems LLC, Orion, MI (US); Robert Bosch GmbH, Stuttgart (DE)

(72) Inventor: Scott Michael Averitt, Roseville, MI (US)

(73) Assignees: Bosch Battery Systems, LLC, Orion, MI (US); Robert Bosch GmbH, Stuttgart (DE)

( * ) Notice: Subject to any disclaimer, the term of this patent is extended or adjusted under 35 U.S.C. 154(b) by 1020 days.

(21) Appl. No.: 14/516,701

(22) Filed: Oct. 17, 2014

(65) Prior Publication Data

US 2015/0108949 A1 Apr. 23, 2015

Related U.S. Application Data

(60) Provisional application No. 61/892,052, filed on Oct. 17, 2013.

(51) Int. Cl.
*H02J 7/00* (2006.01)
*B60L 58/20* (2019.01)
*B60L 58/18* (2019.01)

(52) U.S. Cl.
CPC ............ *H02J 7/0019* (2013.01); *B60L 58/18* (2019.02); *B60L 58/20* (2019.02); *H02J 7/0024* (2013.01)

(58) Field of Classification Search
CPC .................................................... H02J 7/0019
USPC ................................................ 320/118, 122
See application file for complete search history.

(56) References Cited

U.S. PATENT DOCUMENTS

| | | | |
|---|---|---|---|
| 4,175,249 | A | 11/1979 | Gruber |
| 4,816,736 | A | 3/1989 | Dougherty et al. |
| 4,894,764 | A | 1/1990 | Meyer et al. |
| 7,288,919 | B2 | 10/2007 | Morita |
| 7,884,569 | B2 | 2/2011 | Ward |
| 8,288,992 | B2 | 10/2012 | Kramer et al. |
| 8,427,106 | B2 | 4/2013 | Kim et al. |
| 8,427,109 | B2 | 4/2013 | Melichar |
| 2006/0092583 | A1 | 5/2006 | Alahmad et al. |

(Continued)

FOREIGN PATENT DOCUMENTS

EP 2506390 A1 10/2012

*Primary Examiner* — Drew A Dunn
*Assistant Examiner* — Ahmed H Omar
(74) *Attorney, Agent, or Firm* — Maginot Moore & Beck LLP

(57) ABSTRACT

An integrated multiple voltage battery system includes a first pair of output terminals, a second pair of output terminals, a plurality of first battery cells connected in series with each other and operatively connected to the first pair of output terminals, at least one second battery cell operatively connected to the second pair of outlet terminals, and a plurality of switches, the plurality of switches arranged such that each first battery cell in the plurality of first battery cells can be selectively placed in parallel with the at least one second battery cell while electrically isolating the other of the plurality of first battery cells from the at least one second battery cell, wherein each of the plurality of first battery cells has a nominal open cell voltage which is about the same as a nominal open cell voltage of the at least one second battery cell.

15 Claims, 3 Drawing Sheets

(56) References Cited

U.S. PATENT DOCUMENTS

2009/0085553 A1     4/2009  Kumar et al.
2011/0169448 A1*    7/2011  Ichikawa ............... B60K 6/445
                                                           320/109
2014/0183939 A1*    7/2014  Jiang .................. B60L 11/1853
                                                            307/9.1

* cited by examiner

INTEGRATED MULTIPLE VOLTAGE ENERGY STORAGE SYSTEM AND METHOD

CROSS REFERENCE

This application claims the benefit of U.S. Provisional Application No. 61/892,052 filed Oct. 17, 2013, the entire contents of which is herein incorporated by reference.

FIELD OF THE INVENTION

This disclosure relates generally to energy storage systems and more particularly to battery systems or other energy storage systems providing multiple individual battery voltages.

BACKGROUND

Many DC electrical systems require multiple DC voltages in order to operate effectively. In order to supply the different DC voltages, some systems incorporate a variety of batteries and/or other energy storage mediums that operate at the different DC voltage levels. Frequently, the power source that supplies the system operates at only one of the desired voltage levels. In order to supply power at the other operating voltages it is necessary to transfer energy from one DC voltage level to another.

Typically, the provision of various DC voltages from a single DC source is accomplished by implementing a DC/DC switch mode converter that functions to transfer energy from one voltage level to the other. The energy transfer can be either one directional or bi-directional depending on the requirements of the particular system and the design of the converter. These converters generally require multiple semiconductor devices along with magnetic components and relatively large capacitors. As the required power level increases the cost, size, and complexity of the converter also increases. Additionally, in order to keep the size of the components to a minimum the switching frequency of these converters range from 10's of Khz up to several Mhz depending on the design of the converter. The higher frequencies often cause EMC issues with surrounding components and can make it difficult for the converters to meet RF radiation regulations.

The above described challenges can be difficult to overcome for many systems. The challenges are compounded in applications such as automotive applications where compact, inexpensive, and lightweight components are desired. In the automotive context cost is a significant driver due to the large volumes and already high prices of automobiles. Weight is very critical to automotive applications as higher weights directly translate into lower miles per gallon of fuel usage. Additionally, the automotive industry has very strict requirements on EMC performance that are often difficult to meet when using switch mode power supplies. The difficulty in EMC performance is due in part to the close proximity of components within the vehicle as well as the safety critical functions of the systems.

What is needed is a battery system that can provide multiple voltage levels while providing a means to transfer energy between the different portions of the system. It would be beneficial if such a battery system provided a simplified energy transfer process using low switching frequencies. It would be further beneficial if such a system could be realized while reducing weight, size, cost, and complexity compared to conventional systems.

SUMMARY

The disclosure advantageously provides a battery system with multiple voltage levels while providing a means to transfer energy between the different voltage levels. The disclosure provides a way of simplifying the energy transfer process between the multiple voltage levels and the ability to perform this task using much lower switching frequencies. The disclosure accomplishes one or more of the foregoing in some embodiments while reducing weight, size, cost, and complexity over conventional systems.

In one embodiment, an integrated multiple voltage battery system includes a first pair of output terminals, a second pair of output terminals, a plurality of first battery cells connected in series with each other and operatively connected to the first pair of output terminals, at least one second battery cell operatively connected to the second pair of outlet terminals, and a plurality of switches, the plurality of switches arranged such that each first battery cell in the plurality of first battery cells can be selectively placed in parallel with the at least one second battery cell while electrically isolating the other of the plurality of first battery cells from the at least one second battery cell, wherein each of the plurality of first battery cells has a nominal open cell voltage which is about the same as a nominal open cell voltage of the at least one second battery cell.

In one or more embodiments, the plurality of first battery cells includes a third battery cell and a fourth battery cell, a high voltage side of the fourth battery cell is operatively connected to a low voltage side of the third battery, a first pair of serially connected switches is operatively connected to a high voltage side of the third battery cell and a high voltage side of the at least one second battery cell, a second pair of serially connected switches is operatively connected to the low voltage side of the third battery cell and a low voltage side of the at least one second battery cell, a third pair of serially connected switches is operatively connected to the low voltage side of the third battery cell and the high voltage side of the at least one second battery cell, and a fourth pair of serially connected switches is operatively connected to the low voltage side of the fourth battery cell and the low voltage side of the at least one second battery cell.

In one or more embodiments, a system includes a memory in which program instructions are stored, and a controller operatively connected to the memory and the plurality of switches, the controller configured to execute the program instructions to selectively place each of the plurality of first battery cells in parallel with the at least one second battery cell while electrically isolating the other of the plurality of first battery cells from the at least one second battery cell.

In one or more embodiments the controller is configured to execute the program instructions to selectively place the third battery cell in parallel with the at least one second battery cell by controlling the first pair of serially connected switches to place the high voltage side of the third battery in electrical connection with the high voltage side of the at least one second battery cell, controlling the second pair of serially connected switches to place the low voltage side of the third battery and the high voltage side of the fourth battery in electrical connection with the low voltage side of the at least one second battery cell, controlling the third pair of serially connected switches to isolate the low voltage side of the third battery and the high voltage side of the fourth battery from the high voltage side of the at least one second battery cell, and controlling the fourth pair of serially connected switches to isolate the low voltage side of the fourth battery from the low voltage side of the at least one second battery cell.

In one or more embodiments the controller is configured to execute the program instructions to selectively place the fourth battery cell in parallel with the at least one second battery cell by controlling the first pair of serially connected switches to isolate the high voltage side of the third battery from the high voltage side of the at least one second battery cell, controlling the second pair of serially connected switches to isolate the low voltage side of the third battery and the high voltage side of the fourth battery from the low voltage side of the at least one second battery cell, controlling the third pair of serially connected switches to place the low voltage side of the third battery and the high voltage side of the fourth battery in electrical connection with the high voltage side of the at least one second battery cell, and controlling the fourth pair of serially connected switches to place the low voltage side of the fourth battery in electrical connection with the low voltage side of the at least one second battery cell.

In one or more embodiments the plurality of first battery cells comprises a first outer cell, a second outer cell, and at least one inner cell, the first outer cell includes a high voltage side operatively connected to a first of the first pair of outlet terminals, and the second outer cell includes a low voltage side operatively connected to a second of the first pair of outlet terminals. In these embodiments, each of the at least one inner cells includes a high output side operatively connected to a low output side of another of the plurality of first battery cells, and a low output side operatively connected to a high output side of another of the plurality of first battery cells, the plurality of switches includes a first pair of serially connected switches, a second pair of serially connected switches, and a plurality of switch groups, the first pair of serially connected switches is configured to selectively place the high output side of the first outer cell in electrical connection with a high output side of the least one second battery cell, the second pair of serially connected switches is configured to selectively place the low output side of the second outer cell in electrical connection with a low output side of the least one second battery cell, and each of the at least one inner cells is associated with a first and a second of the plurality of switch groups. Additionally, one of the first and the second of the plurality of switch groups is configured to selectively place the high voltage side of the associated inner cell in electrical connection with the high voltage side of the at least one second battery cell, place the high voltage side of the associated inner cell in electrical connection with the low voltage side of the at least one second battery cell, and electrically isolate the high voltage side of the associated inner cell from the at least one second battery cell, and the other of the first and the second of the plurality of switch groups is configured to selectively place the low voltage side of the associated inner cell in electrical connection with the high voltage side of the at least one second battery cell, place the low voltage side of the associated inner cell in electrical connection with the low voltage side of the at least one second battery cell, and electrically isolate the low voltage side of the associated inner cell from the at least one second battery cell.

In one or more embodiments, a system includes a memory in which program instructions are stored, and a controller operatively connected to the memory and the plurality of switches, the controller configured to execute the program instructions to selectively place each first battery cell in the plurality of first battery cells in parallel with the at least one second battery cell while electrically isolating the other of the plurality of first battery cells from the at least one second battery cell.

In one or more embodiments each of the plurality of first battery cells exhibits a nominal voltage of about 3.0V to 4.2V.

In one or more embodiments the plurality first battery cells consists of four battery cells.

In one or more embodiments the plurality of switch groups includes a first switch group and a second switch group, the first switch group includes a third pair of serially connected switches and a fourth pair of serially connected switches, and the second switch group includes a fifth pair of serially connected switches and a sixth pair of serially connected switches. Additionally, the third pair of serially connected switches is in electrical connection with a high voltage side of a first of the at least one inner cells and a low voltage side of a first adjoining cell on a first side, and a high voltage side of the at least one second cell on a second side, the first adjoining cell is one of a second of the at least one inner cells and the first outer cell, and the fourth pair of serially connected switches is in electrical connection with the high voltage side of the first of the at least one inner cells and the low voltage side of the first adjoining cell on a third side, and a low voltage side of the at least one second cell on a fourth side. Furthermore, the fifth pair of serially connected switches is in electrical connection with a low voltage side of the first of the at least one inner cells and a high voltage side of a second adjoining cell on a fifth side, and the high voltage side of the at least one second cell on a sixth side, and the second adjoining cell is one of a third of the at least one inner cells and the second outer cell, and the sixth pair of serially connected switches is in electrical connection with the low voltage side of the first of the at least one inner cells and a high voltage side of the first adjoining cell on a seventh side, and the low voltage side of the at least one second cell on an eighth side.

In one embodiment, a method includes serially connecting a plurality of first battery cells in series with each other, operatively connecting the series connected plurality of first battery cells to a first pair of output terminals, operatively connecting at least one second battery cell to a second pair of outlet terminals, the at least one second battery cell having a nominal open cell voltage which is about the same as a nominal open cell voltage of each of the plurality of first battery cells, controlling a plurality of serially connected switch pairs to place a first cell of the plurality of first battery cells in parallel with the at least one second battery cell while electrically isolating a second cell of the plurality of first battery cells from the at least one second battery cell, and further controlling the plurality of serially connected switch pairs to electrically isolate the first cell from the at least one second battery cell while placing the second cell in parallel with the at least one second battery cell.

In one or more embodiments controlling the plurality of serially connected switch pairs includes executing program instructions stored within a memory with a processor to energize a first switch pair of the plurality of serially connected switch pairs, the first switch pair including a first side in electrical connection with a high output side of the first cell, and a second side in electrical connection with a high output side of the at least one second battery cell, energize a second switch pair of the plurality of serially connected switch pairs, the second switch pair including a third side in electrical connection with a low output side of the first cell and a high output side of the second cell, and a fourth side in electrical connection with a low output side of the at least one second battery cell, control a third switch pair of the plurality of serially connected switch pairs to a de-energized state, the third switch pair including a fifth side in electrical connection with the low output side of the first cell and the high output side of the second cell, and a sixth side in electrical connection with the high output side of the at least one second battery cell, and control a fourth switch pair of the plurality of serially connected switch pairs to a de-energized state, the fourth switch pair including a seventh side in electrical connection with a low output side of the second cell, and an eighth side in electrical connection with the low output side of the at least one second battery cell.

In one or more embodiments further controlling the plurality of serially connected switch pairs includes executing the program instructions stored within the memory with the processor to de-energize the first switch pair, de-energize the second switch pair of the plurality of serially connected switch pairs, the second switch pair including a third side in electrical connection with a low output side of the second cell, and a fourth side in electrical connection with a low output side of the at least one second battery cell, energize the third switch pair, and energize the fourth switch pair.

In one or more embodiments a method includes executing the program instructions stored within the memory with the processor to determine that the first cell has a state of charge greater than a state of charge of the second cell prior to controlling and further controlling the plurality of serially connected switch pairs, wherein further controlling the plurality of serially connected switch pairs occurs after controlling the plurality of serially connected switch pairs.

In one or more embodiments determining that the first cell has a state of charge greater than a state of charge of the second cell includes obtaining a first open cell voltage associated with the first cell, and obtaining a second open cell voltage associated with the second cell.

DESCRIPTION

Figure 1:
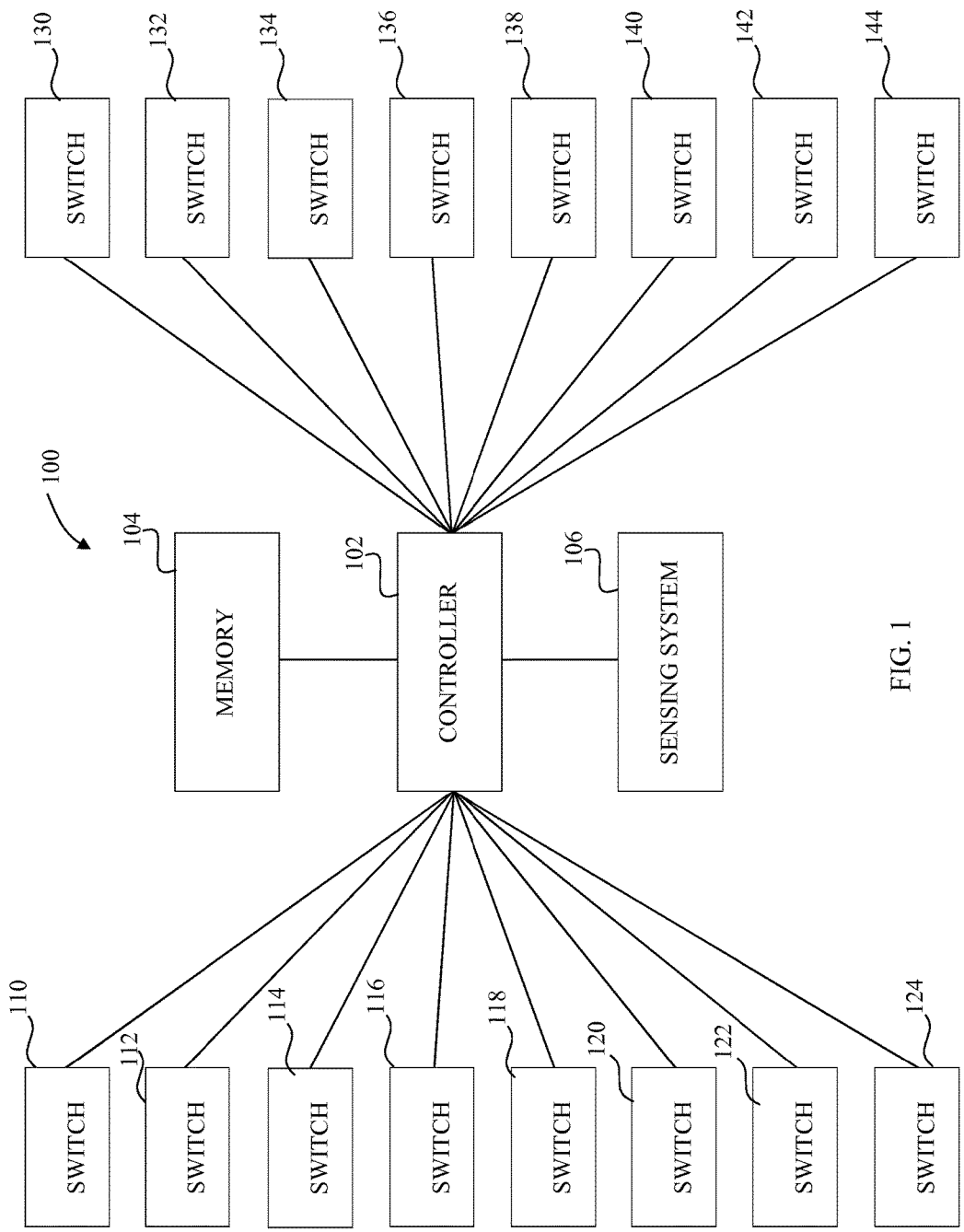
FIG. 1 depicts a schematic view of an energy management system in the form of a battery management system which provides a battery system with multiple voltage levels while providing a mechanism to transfer energy between the different voltage levels.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art which this disclosure pertains.

FIG. 1 depicts a battery management system (BMS) 100 which is some embodiments is located within a vehicle. The system 100 includes a controller 102, a memory 104, a sensing system 106, and a plurality of switches 110-144. The controller 102 is operably connected to each of the other components in the system 100 using one or more communication systems which can include a Controller Area Network (CAN) bus, a Local Interconnect Network (LIN) bus, or any other desired communication system. For example, the communication system in one embodiment is a wireless network that connects various components to the controller 102.

The controller 102 executes program instructions which are stored within the memory 104 to control the switches 110-144. In some embodiments, the switches 110-144 are controlled additionally or alternatively based upon input from a user interface (not shown). The switches 110-144 are used to control the configuration of a battery pack 150 shown in FIG. 2. The battery pack 150 in this embodiment includes a pair of high voltage terminals 152 and a pair of low voltage terminals 154.

The potential of the high voltage terminals 152 is established by a battery stack 156 which in this embodiment includes four battery cells 158, 160, 162, and 164 while the potential of the low voltage terminals 154 is established by a battery cell 166. The battery stack 156 is similar to many known higher voltage batteries which also consist of multiple lower voltage cells that are then stacked in series in order to realize higher overall voltage outputs. In one embodiment, the battery cells 158, 160, 162, and 164 are lithium ion battery cells which exhibit open cell voltages (OCV) of about 3.0V to 4.2V per cell depending on the cell chemistry and current state of charge. Nominal OCV, that is, the OCV at beginning of life with a full charge, is around 3.7-4.0V.

Figure 2:
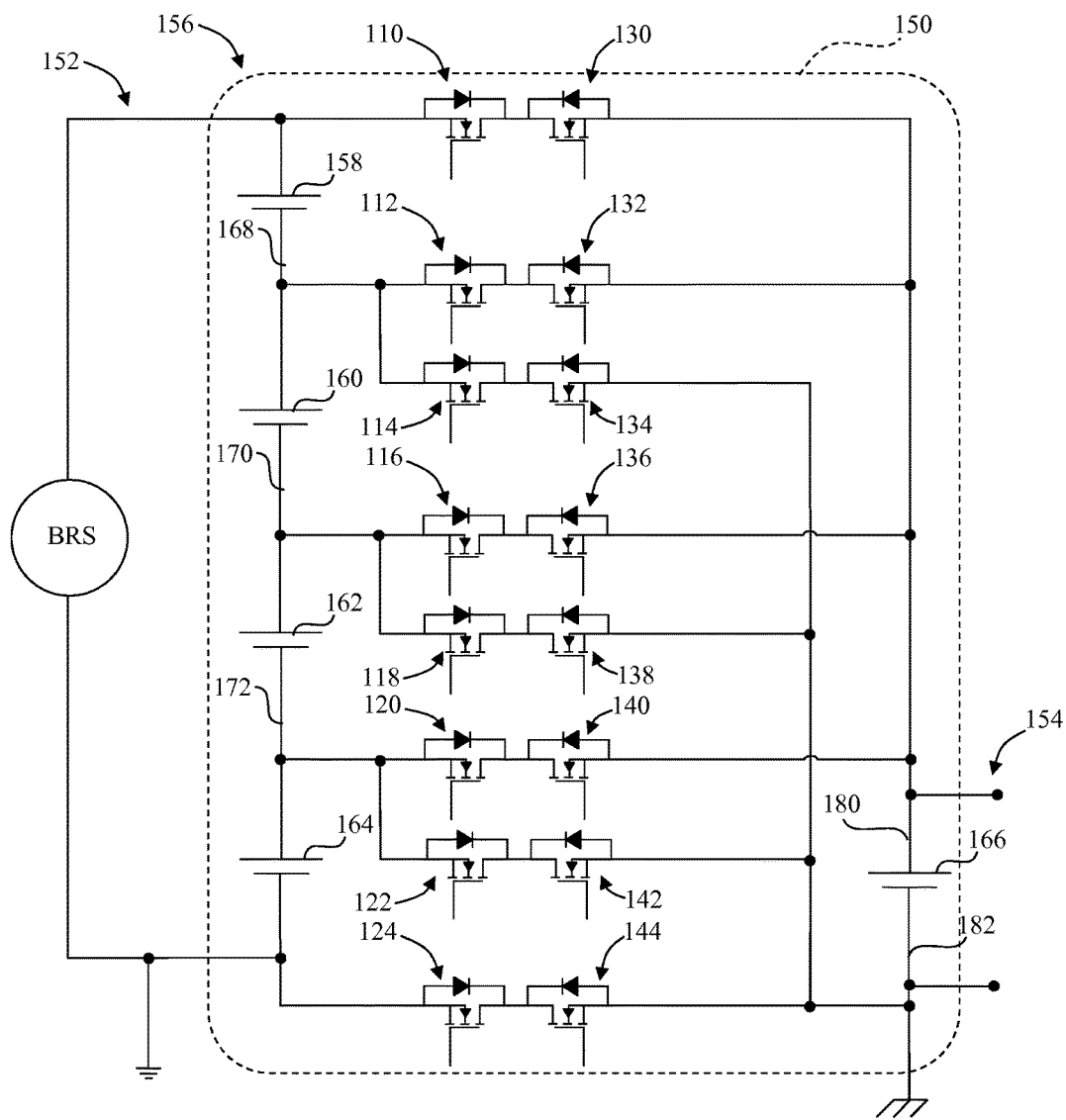
FIG. 2 depicts a schematic of a battery pack controlled by the battery management system of FIG. 1 including a switch array that provides a mechanism to transfer energy between the battery cells in the battery pack.

In the embodiment of FIG. 2, the high voltage terminals 152 are configured to provide a nominal 16V OCV. This is accomplished by connecting the battery cells 158, 160, 162, and 164 in series using connectors 168, 170, and 172. Of course, by stacking additional cells, even higher output voltages are possible.

The nominal OCV of the low voltage terminals 154 in this embodiment is 4V. In other embodiments, the nominal OCV of the low voltage terminals 154 is selected to be any desired multiple of the nominal OCV of the battery cells 158, 160, 162 and 164 which is lower than the potential of the high voltage terminals 152. This can be accomplished, for example, by replacing the battery cell 166 with a battery stack.

By setting the potential of the low voltage terminals 154 at an even multiple of the battery cells 158, 160, 162 and 164 the battery cell 166, also referred to as a "secondary battery", can be connected in parallel with different groups of cells from the battery stack 156 using the switches 110-144. To this end, the switches 110-144 are arranged such that any single one or combination of the battery cells 158, 160, 162, and 164 can be connected to the low voltage output terminals 154.

Specifically, the serially connected switches 110/130 allow the high voltage side of the battery cell 158 to be controllably connected to a high output line 180 of the low voltage output terminals 154 and secondary battery 166. The serially connected switches 114/134 allow the low voltage side of battery cell 158 (connector 168) to be controllably connected to a low output line 182 of the low voltage output terminals 154 and secondary battery 166. The serially connected switches 112/132 allow the high voltage side of the battery cell 160 (connector 168) to be controllably connected to a high output line 180 of the low voltage output terminals 154 and secondary battery 166. The serially connected switches 118/138 allow the low voltage side of battery cell 160 (connector 170) to be controllably connected to a low output line 182 of the low voltage output terminals 154 and secondary battery 166. The serially connected switches 116/136 allow the high voltage side of the battery cell 162 (connector 170) to be controllably connected to a high output line 180 of the low voltage output terminals 154 and secondary battery 166. The serially connected switches 120/140 allow the low voltage side of battery cell 162 (connector 172) to be controllably connected to a low output line 182 of the low voltage output terminals 154 and secondary battery 166. The serially connected switches 120/140 allow the high voltage side of the battery cell 164 (connector 172) to be controllably connected to a high output line 180 of the low voltage output terminals 154 and secondary battery 166. The serially connected switches 124/144 allow the low voltage side of battery cell 164 to be controllably connected to a low output line 182 of the low voltage output terminals 154 and secondary battery 166.

By selectively energizing the switches 110-144, any of the battery cells 158, 160, 162, and 164 can be connected in parallel with the battery cell 166. For example, energizing the switches 110/130 places the high voltage side of the battery cell 158 in electrical connection with the high voltage side of the battery cell 166, while energizing the switches 114/134 places the low voltage side of the battery cell 158 in electrical connection with the low voltage side of the battery cell 166. With the remaining switches de-energized, the battery cell 158 is placed in parallel with the battery cell 166 with the remaining cells 160, 162, and 164 electrically isolated from the battery cell 166. Specifically, while one of the sides of the remaining cells 160, 162, and 164 is in electrical connection with one of the sides of the battery cell 166, the other side of the remaining cells 160, 162, and 164 is isolated from the battery cell 166. Thus, the remaining cells 160, 162, and 164 are electrically isolated from the battery cell 166 even though one side of the cells 160, 162, and 164 is in electrical connection with the battery cell 166.

In a typical operation, the controller 102 would then de-energize the switches 110/130/114/134 to isolate the battery cell 158 from the battery cell 166, and energize the switches 112/132/118/138. Energizing the switches 112/132 places the high voltage side of the battery cell 160 in electrical connection with the high voltage side of the battery cell 166, while energizing the switches 118/138 places the low voltage side of the battery cell 160 in electrical connection with the low voltage side of the battery cell 166. With the remaining switches de-energized, the battery cell 160 is placed in parallel with the battery cell 166 with the remaining cells 158, 162, and 164 isolated from the battery cell 166. This general sequence is then continued as desired to place each of the cells 158, 160, 162, and 164 in parallel with the cell 166.

The ability to selectively connect any one of the battery cells 158, 160, 162 and 164 in parallel with the battery cell 166 allows for the transfer of charge between the battery cells 158, 160, 162 and 164. This is important in systems incorporating battery stacks such as the battery stack 156 for both safety and lifetime of the cells. By balancing the cells, the load on each of the cells can be equalized maximizing the useful life of the stack.

Figure 3:
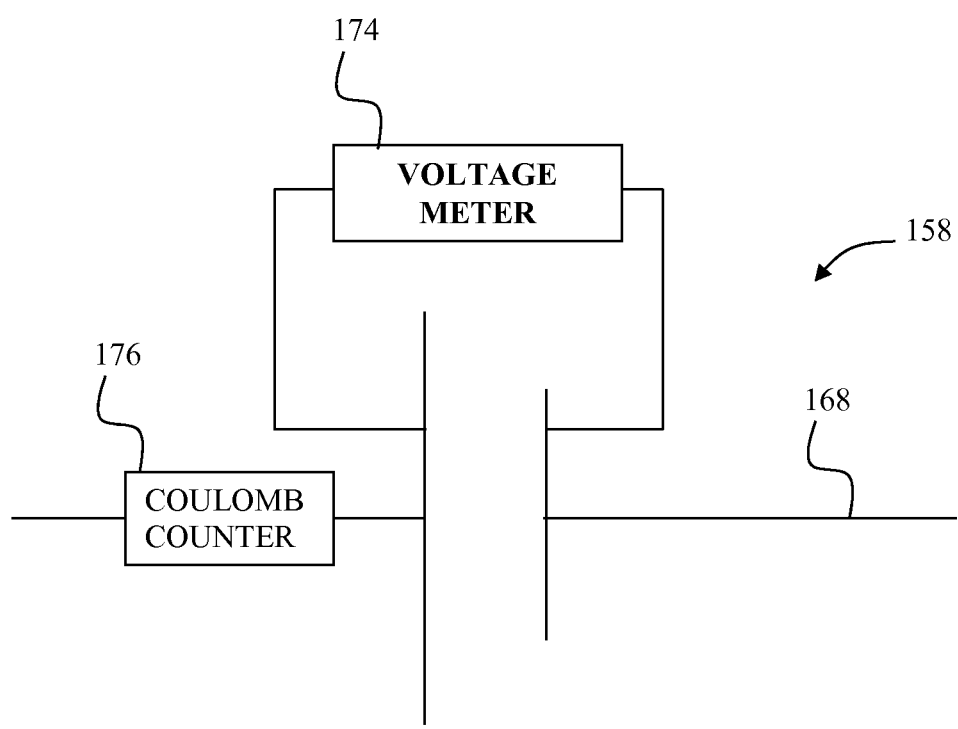
FIG. 3 depicts a schematic of a cell of the battery pack of FIG. 2 showing voltage and current meters associated with the cell.

In order to optimally balance the cells 158, 160, 162, and 164, the controller 102 tracks the state of charge of the cells 158, 160, 162, 164, and 166. To this end, the sensing system 106 in some embodiments includes volt meters and/or current meters configured to monitor the individual cells 158, 160, 162, 164, and 166. By way of example, FIG. 3 depicts the cell 158 with a voltmeter 174 and a coulomb counter 176. In some embodiments, each of the cells 158, 160, 162, 164, and 166 include an associated voltmeter and a coulomb counter and the voltmeters and coulomb counters are operatively connected to the controller 102.

Additionally, state of health (SOH) of the cells 158, 160, 162, 164, and 166 is tracked in some embodiments. SOH may be tracked by a battery model stored within the memory 104. The controller 102 thus controls the switches 110-144 to selectively connect the cells 158, 160, 162, and 164 to the cell 166 based upon the voltage and the SOC of the cells 158, 160, 162, and 164.

The above described embodiment provides a multi-output voltage battery system that integrates multiple system components into a single sub-system. The above described embodiment provides for weight, size, and cost reductions when compared to other systems. The above described embodiment provides benefits from being able to share the BMS controller to perform it's normal functions as well as performing the functions of controlling the transfer of charge from one voltage level to the other voltage level. The above described embodiment significantly reduces the need for large magnetic and capacitor components. Due to the larger energy storage of the batteries as compared to large capacitors the switching frequency can be greatly reduced. Reducing the switching frequency reduces the EMI produced as well as improving the efficiency of the energy transfer by significantly reducing losses associated with higher frequency switching.

While the embodiment of FIG. 2 depicts a 16V high side and a 4V low side, the system can be modified to arrive at different values so long as the secondary voltage is an even multiple of the individual cell voltage of the higher voltage terminals. Thus, a battery pack with a high side voltage of 48V obtained using 12 cells can be combined with any of the following low side voltages: 4V, 8V, 12V, 16V, and 24V. Additionally, while the above described embodiments used battery cells, any or all of the battery cells 158, 160, 162, 164 and 166 are replaced with one or more double layer capacitors in other embodiments. Moreover, while finding utility in automotive applications, the disclosure is also useful in non-automotive applications.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. An integrated multiple voltage battery system comprising:
   a first pair of output terminals;
   a second pair of output terminals;
   a plurality of first battery cells connected in series with each other and operatively connected to the first pair of output terminals;
   at least one second battery cell operatively connected to the second pair of outlet terminals; and
   a plurality of switches, the plurality of switches arranged such that each first battery cell in the plurality of first battery cells can be selectively placed in parallel with the at least one second battery cell while electrically isolating the other of the plurality of first battery cells from the at least one second battery cell, wherein each of the plurality of first battery cells has a nominal open cell voltage which is about the same as a nominal open cell voltage of the at least one second battery cell.

2. The system of claim 1, wherein:
the plurality of first battery cells comprises a third battery cell and a fourth battery cell;
a high voltage side of the fourth battery cell is operatively connected to a low voltage side of the third battery;
a first pair of serially connected switches is operatively connected to a high voltage side of the third battery cell and a high voltage side of the at least one second battery cell;
a second pair of serially connected switches is operatively connected to the low voltage side of the third battery cell and a low voltage side of the at least one second battery cell;
a third pair of serially connected switches is operatively connected to the low voltage side of the third battery cell and the high voltage side of the at least one second battery cell; and
a fourth pair of serially connected switches is operatively connected to the low voltage side of the fourth battery cell and the low voltage side of the at least one second battery cell.

3. The system of claim 2, further comprising:
a memory in which program instructions are stored; and
a controller operatively connected to the memory and the plurality of switches, the controller configured to execute the program instructions to selectively place each of the plurality of first battery cells in parallel with the at least one second battery cell while electrically isolating the other of the plurality of first battery cells from the at least one second battery cell.

4. The system of claim 3, wherein the controller is configured to execute the program instructions to selectively place the third battery cell in parallel with the at least one second battery cell by:
controlling the first pair of serially connected switches to place the high voltage side of the third battery in electrical connection with the high voltage side of the at least one second battery cell;
controlling the second pair of serially connected switches to place the low voltage side of the third battery and the high voltage side of the fourth battery in electrical connection with the low voltage side of the at least one second battery cell;
controlling the third pair of serially connected switches to isolate the low voltage side of the third battery and the high voltage side of the fourth battery from the high voltage side of the at least one second battery cell; and
controlling the fourth pair of serially connected switches to isolate the low voltage side of the fourth battery from the low voltage side of the at least one second battery cell.

5. The system of claim 4, wherein the controller is configured to execute the program instructions to selectively place the fourth battery cell in parallel with the at least one second battery cell by:
controlling the first pair of serially connected switches to isolate the high voltage side of the third battery from the high voltage side of the at least one second battery cell;
controlling the second pair of serially connected switches to isolate the low voltage side of the third battery and the high voltage side of the fourth battery from the low voltage side of the at least one second battery cell;
controlling the third pair of serially connected switches to place the low voltage side of the third battery and the high voltage side of the fourth battery in electrical connection with the high voltage side of the at least one second battery cell; and
controlling the fourth pair of serially connected switches to place the low voltage side of the fourth battery in electrical connection with the low voltage side of the at least one second battery cell.

6. The system of claim 1, wherein:
the plurality of first battery cells comprises a first outer cell, a second outer cell, and at least one inner cell;
the first outer cell includes a high voltage side operatively connected to a first of the first pair of outlet terminals;
the second outer cell includes a low voltage side operatively connected to a second of the first pair of outlet terminals;
each of the at least one inner cells includes a high output side operatively connected to a low output side of another of the plurality of first battery cells, and a low output side operatively connected to a high output side of another of the plurality of first battery cells;
the plurality of switches includes a first pair of serially connected switches, a second pair of serially connected switches, and a plurality of switch groups;
the first pair of serially connected switches is configured to selectively place the high output side of the first outer cell in electrical connection with a high output side of the least one second battery cell;
the second pair of serially connected switches is configured to selectively place the low output side of the second outer cell in electrical connection with a low output side of the least one second battery cell;
each of the at least one inner cells is associated with a first and a second of the plurality of switch groups;
one of the first and the second of the plurality of switch groups is configured to selectively place the high voltage side of the associated inner cell in electrical connection with the high voltage side of the at least one second battery cell, place the high voltage side of the associated inner cell in electrical connection with the low voltage side of the at least one second battery cell, and electrically isolate the high voltage side of the associated inner cell from the at least one second battery cell; and
the other of the first and the second of the plurality of switch groups is configured to selectively place the low voltage side of the associated inner cell in electrical connection with the high voltage side of the at least one second battery cell, place the low voltage side of the associated inner cell in electrical connection with the low voltage side of the at least one second battery cell, and electrically isolate the low voltage side of the associated inner cell from the at least one second battery cell.

7. The system of claim 6, further comprising:
a memory in which program instructions are stored; and
a controller operatively connected to the memory and the plurality of switches, the controller configured to execute the program instructions to selectively place each first battery cell in the plurality of first battery cells in parallel with the at least one second battery cell while electrically isolating the other of the plurality of first battery cells from the at least one second battery cell.

8. The system of claim 7, wherein each of the plurality of first battery cells exhibits a nominal voltage of about 3.0V to 4.2V.

9. The system of claim 8, wherein the plurality first battery cells consists of four battery cells.

10. The system of claim 7, wherein:
the plurality of switch groups includes a first switch group and a second switch group;
the first switch group includes a third pair of serially connected switches and a fourth pair of serially connected switches;
the second switch group includes a fifth pair of serially connected switches and a sixth pair of serially connected switches;
the third pair of serially connected switches is in electrical connection with a high voltage side of a first of the at least one inner cells and a low voltage side of a first adjoining cell on a first side, and a high voltage side of the at least one second cell on a second side;
the first adjoining cell is one of a second of the at least one inner cells and the first outer cell;
the fourth pair of serially connected switches is in electrical connection with the high voltage side of the first of the at least one inner cells and the low voltage side of the first adjoining cell on a third side, and a low voltage side of the at least one second cell on a fourth side;
the fifth pair of serially connected switches is in electrical connection with a low voltage side of the first of the at least one inner cells and a high voltage side of a second adjoining cell on a fifth side, and the high voltage side of the at least one second cell on a sixth side;
the second adjoining cell is one of a third of the at least one inner cells and the second outer cell; and
the sixth pair of serially connected switches is in electrical connection with the low voltage side of the first of the at least one inner cells and a high voltage side of the first adjoining cell on a seventh side, and the low voltage side of the at least one second cell on an eighth side.

11. A method of operating an integrated multiple voltage battery system comprising:
serially connecting a plurality of first battery cells in series with each other;
operatively connecting the series connected plurality of first battery cells to a first pair of output terminals;
operatively connecting at least one second battery cell to a second pair of outlet terminals, the at least one second battery cell having a nominal open cell voltage which is about the same as a nominal open cell voltage of each of the plurality of first battery cells;
controlling a plurality of serially connected switch pairs to place a first cell of the plurality of first battery cells in parallel with the at least one second battery cell while electrically isolating a second cell of the plurality of first battery cells from the at least one second battery cell; and
further controlling the plurality of serially connected switch pairs to electrically isolate the first cell from the at least one second battery cell while placing the second cell in parallel with the at least one second battery cell.

12. The method of claim 11, wherein controlling the plurality of serially connected switch pairs comprises executing program instructions stored within a memory with a processor to:
energize a first switch pair of the plurality of serially connected switch pairs, the first switch pair including a first side in electrical connection with a high output side of the first cell, and a second side in electrical connection with a high output side of the at least one second battery cell;
energize a second switch pair of the plurality of serially connected switch pairs, the second switch pair including a third side in electrical connection with a low output side of the first cell and a high output side of the second cell, and a fourth side in electrical connection with a low output side of the at least one second battery cell;
control a third switch pair of the plurality of serially connected switch pairs to a de-energized state, the third switch pair including a fifth side in electrical connection with the low output side of the first cell and the high output side of the second cell, and a sixth side in electrical connection with the high output side of the at least one second battery cell; and
control a fourth switch pair of the plurality of serially connected switch pairs to a de-energized state, the fourth switch pair including a seventh side in electrical connection with a low output side of the second cell, and an eighth side in electrical connection with the low output side of the at least one second battery cell.

13. The method of claim 11, wherein further controlling the plurality of serially connected switch pairs comprises executing the program instructions stored within the memory with the processor to:
de-energize the first switch pair;
de-energize the second switch pair of the plurality of serially connected switch pairs, the second switch pair including a third side in electrical connection with a low output side of the second cell, and a fourth side in electrical connection with a low output side of the at least one second battery cell;
energize the third switch pair; and
energize the fourth switch pair.

14. The method of claim 11, further comprising executing the program instructions stored within the memory with the processor to:
determine that the first cell has a state of charge greater than a state of charge of the second cell prior to controlling and further controlling the plurality of serially connected switch pairs, wherein further controlling the plurality of serially connected switch pairs occurs after controlling the plurality of serially connected switch pairs.

15. The method of claim 14, wherein determining that the first cell has a state of charge greater than a state of charge of the second cell comprises:
obtaining a first open cell voltage associated with the first cell; and
obtaining a second open cell voltage associated with the second cell.

* * * * *